United States Patent [19]
Honma

[11] Patent Number: 5,761,348
[45] Date of Patent: Jun. 2, 1998

[54] DATA PROCESSING APPARATUS WITH DATA BIT WIDTH CONVERSION

[75] Inventor: Yoshihiro Honma, Asaka, Japan

[73] Assignee: Canon Kabushiki Kaisha, Tokyo, Japan

[21] Appl. No.: 573,534

[22] Filed: Dec. 15, 1995

[30] Foreign Application Priority Data

Dec. 22, 1994 [JP] Japan ................... 6-320033

[51] Int. Cl.⁶ .............................. G06K 9/54; G06K 9/60
[52] U.S. Cl. .................................... 382/305; 395/886
[58] Field of Search ..................... 395/886, 890, 395/889; 364/419.14; 382/100, 305

[56] References Cited

U.S. PATENT DOCUMENTS

| | | | |
|---|---|---|---|
| 4,593,373 | 6/1986 | Kiuchi et al. | 395/886 |
| 4,691,364 | 9/1987 | Fukuzawa et al. | 382/299 |
| 4,761,729 | 8/1988 | Brion | 395/886 |
| 5,014,236 | 5/1991 | Pogozelski et al. | 395/886 |
| 5,040,232 | 8/1991 | Kanno | 382/305 |
| 5,043,935 | 8/1991 | Taniani et al. | 395/886 |
| 5,287,497 | 2/1994 | Behera | 382/305 |
| 5,295,000 | 3/1994 | Nonoshita et al. | 358/444 |
| 5,416,907 | 5/1995 | Polzin et al. | 395/886 |
| 5,548,766 | 8/1996 | Kaneko et al. | 395/886 |
| 5,557,707 | 9/1996 | Inoue et al. | 395/106 |
| 5,592,508 | 1/1997 | Cooper | 395/889 |
| 5,608,882 | 3/1997 | Abert et al. | 395/886 |

*Primary Examiner*—Joseph Mancuso
*Assistant Examiner*—Jayanti K. Patel
*Attorney, Agent, or Firm*—Fitzpatrick, Cella, Harper & Scinto

[57] ABSTRACT

In outputting data input in units of a bits in units of b bits (a<b) using a memory for storing data, the reading of the memory is controlled such that a first item of b-bit data is formed in so as to include all of a first item of a-bit data. Items of b-bit data succeeding the first item of the b-bit data are formed by using b/k bits taken from each of k items of a-bit data of those items of the a-bit data succeeding the first item of a-bit data, and the portion of the first item of b-bit data other than the first item of a-bit data is formed of (a−b/k) bits in the succeeding items of a-bit data (where a, b and k are integers), whereby the units in data processing can be changed by a simple construction and improvement in data transfer efficiency can be achieved.

12 Claims, 7 Drawing Sheets

FIG. 1(a)

FIG. 1(b) INPUT/OUTPUT OF DATA IN 10/16 CONVERSION

| 10/16 CONVERSION | | 1 | 2 | 3 | 4 | 5 | 6 | 7 | 8 |
|---|---|---|---|---|---|---|---|---|---|
| | INPUT (10-BIT DATA) | ABCDE | FGHIJ | KLMNO | PQRST | ABCDE | FGHIJ | KLMNO | PQRST |
| | | – | 9 | – | 10 | 11 | – | 12 | 13 |
| | OUTPUT (16-BIT DATA) | | ABCDEFGH | | IJKLMNOP | QRSTABCD | | EFGHIJKL | MNOPQRST |

FIG. 1(c) INPUT/OUTPUT OF DATA IN 16/10 CONVERSION

| 16/10 CONVERSION | | 9 | 10 | 11 | 12 | 13 | – | – | – |
|---|---|---|---|---|---|---|---|---|---|
| | INPUT (16-BIT DATA) | ABCDEFGH | IJKLMNOP | QRSTABCD | EFGHIJKL | MNOPQRST | | | |
| | | 1 | 2 | 3 | 4 | 5 | 6 | 7 | 8 |
| | OUTPUT (10-BIT DATA) | ABCDE | FGHIJ | KLMNO | PQRST | ABCDE | FGHIJ | KLMNO | PQRST |

FIG. 2(a)

FIG. 2(b) INPUT/OUTPUT OF DATA IN 10/16 CONVERSION

| 10/16 CONVERSION | | 1 | 2 | 3 | 4 | 5 | 6 | 7 | 8 |
|---|---|---|---|---|---|---|---|---|---|
| | INPUT (10-BIT DATA) | ABCDE | FGHIJ | KLMNO | PQRST | UVWXY | ABCDE | FGHIJ | KLMNO |
| | | – | 9 | – | 10 | 11 | – | 12 | 13 |
| | OUTPUT (16-BIT DATA) | | ABCDFGHI | | KLMNPQRS | UVWXTOJE | | ABCDFGHI | KLMNOJEY |

FIG. 2(c) INPUT/OUTPUT OF DATA IN 16/10 CONVERSION

| 16/10 CONVERSION | | 9 | 10 | 11 | – | 12 | 13 | – | – | – | – |
|---|---|---|---|---|---|---|---|---|---|---|---|
| | INPUT (16-BIT DATA) | ABCDFGHI | KLMNPQRS | UVWXTOJE | | ABCDFGHI | KLMNOJEY | | | | |
| | | – | – | 1 | 2 | 3 | 4 | 5 | 6 | 7 | 8 |
| | OUTPUT (10-BIT DATA) | | | ABCDE | FGHIJ | KLMNO | PQRST | ABCDE | FGHIJ | KLMNO | PQRST |

FIG. 3(a) DATA STRUCTURE IN 10/16 AND REVERSE (16/10) CONVERSION

FIG. 3(b) INPUT/OUTPUT OF DATA IN 10/16 CONVERSION

| 10/16 CONVERSION | | 1 | 2 | 3 | 4 | 5 | 6 | 7 | 8 |
|---|---|---|---|---|---|---|---|---|---|
| | INPUT (10-BIT DATA) | ABCDE | FGHIJ | KLMNO | PQRST | ABCDE | FGHIJ | KLMNO | PQRST |
| | | – | – | – | 9 | 10 | 11 | 12 | 13 |
| | OUTPUT (16-BIT DATA) | | | | ABCDEJOT | FGHIKLMN | PQRSABCD | FGHIKLMN | PQRSTOJE |

FIG. 3(c) INPUT/OUTPUT OF DATA IN 16/10 CONVERSION

| 16/10 CONVERSION | | 9 | 10 | 11 | 12 | 13 | – | – | – |
|---|---|---|---|---|---|---|---|---|---|
| | INPUT (16-BIT DATA) | ABCDEJOT | FGHIKLMN | PQRSABCD | FGHIKLMN | PQRSTOJE | | | |
| | | 1 | 2 | 3 | 4 | 5 | 6 | 7 | 8 |
| | OUTPUT (10-BIT DATA) | ABCDE | FGHIJ | KLMNO | PQRST | ABCDE | FGHIJ | KLMNO | PQRST |

DATA PROCESSING APPARATUS WITH DATA BIT WIDTH CONVERSION

BACKGROUND OF THE INVENTION

1. Field of the Invention

The present invention relates to data processing apparatus and, in particular, to data processing apparatus for converting processing units for data composed of a plurality of bits.

2. Description of the Related Art

Apparatus having a bus, memory, etc. having a width of a plurality of bits have conventionally been known.

Of such apparatus, in a system having a bus, memory, etc. with a 16-bit width, when data of a width other than the 16-bit width is output from an A/D converter or the like, it is more desirable to convert the data to 16-bit data width than to process it as it is since that helps to achieve an improvement in terms of transfer efficiency for DMA, etc., thereby attaining an improvement in processing capacity. Further, this also helps to achieve an improvement in memory use efficiency.

Thus, when, for example, data of 10-bit width is input, a 10/16 bit conversion circuit for converting 10-bit width data into 16-bit width data, and a 16/10 bit conversion circuit for the reverse conversion are used. Such circuits will be described below.

Figure 1A:
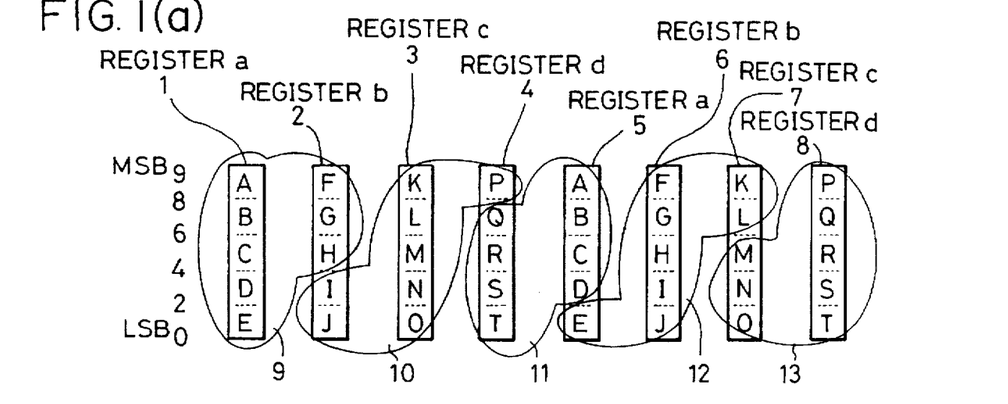
FIGS. 1(a) through 1(c) are diagrams for illustrating a conventional conversion operation.
Figure 1B:
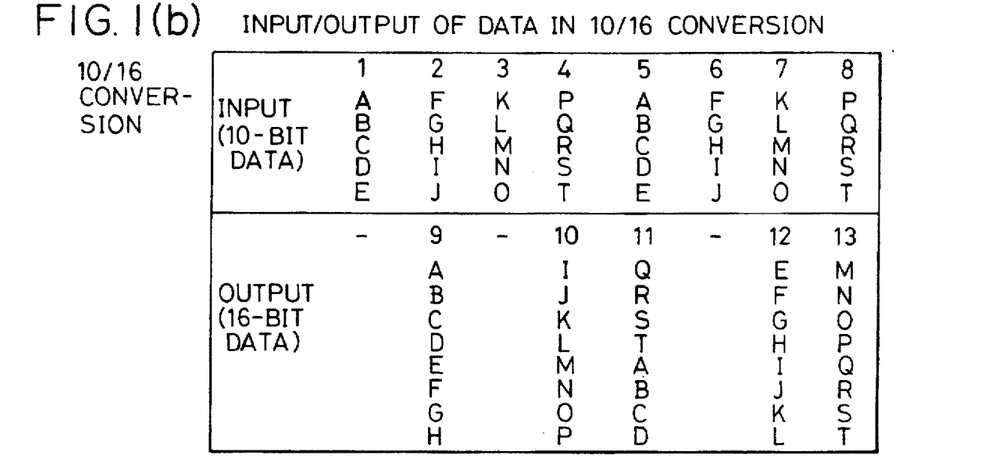
Figure 1C:
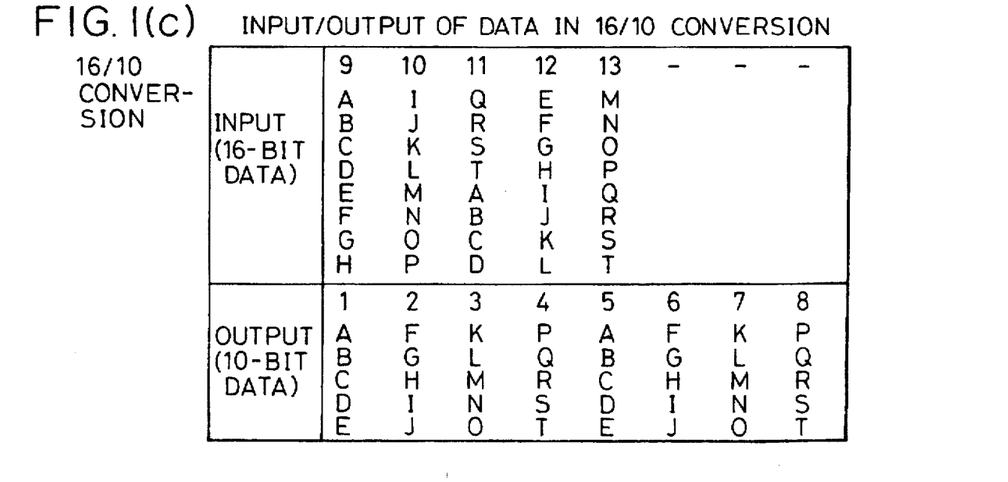

FIGS. 1(a) through 1(c) are conceptual diagrams for the operation of a conventional conversion circuit of this type.

In this conventional example, 10-bit width data from an A/D conversion circuit or the like is first converted so as to constitute 5 words of 16-bit width data in units of 8 words. In this 10/16 bit conversion, the input 10-bit data is successively blocked by 16 bits starting from the bit of highest order to thereby convert the data into 16-bit data.

Similarly, in 16/10 bit conversion, which is the reverse of the above conversion, the input 16-bit data is successively blocked by 10 bits starting from the bit of highest order to convert the data into 10-bit data.

In the case of a conversion circuit of this type, the register used in the conversion must be of 40 bits in total, from A to T (each in units of 2 bits), shown in FIG. 1(a).

In such a circuit, when 8-bit width data is input to be formed into 16-bit width data, and this 16-bit width data is to be converted to 8-bit width data with a similar construction, it is necessary to pass the data through a circuit for the reverse conversion. Thus, the conversion cannot be easily effected.

Figure 2A:
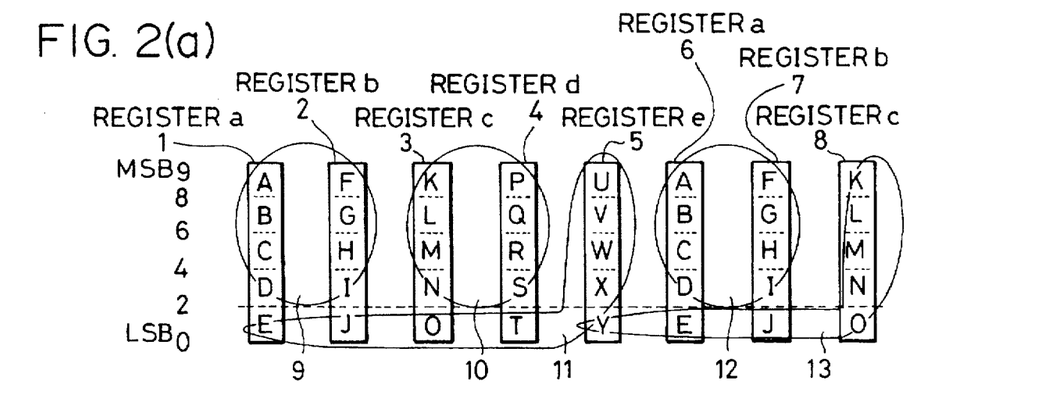
FIGS. 2(a) through 2(c) are diagrams for illustrating another conventional conversion operation.
Figure 2B:
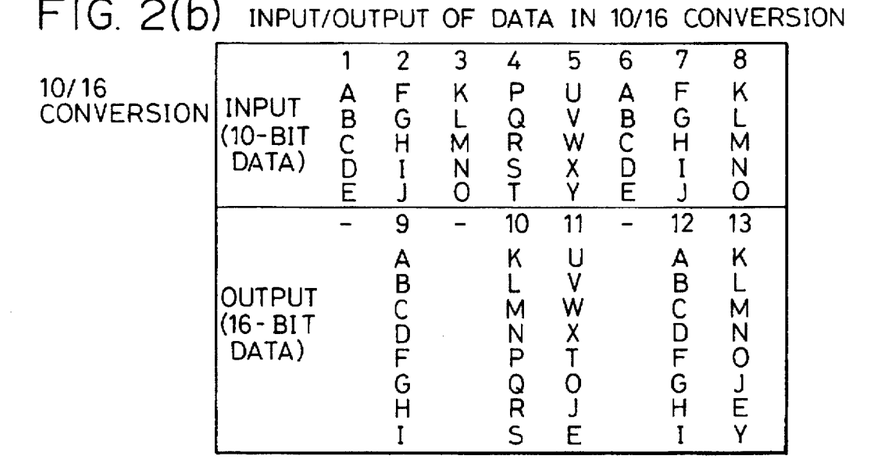
Figure 2C:
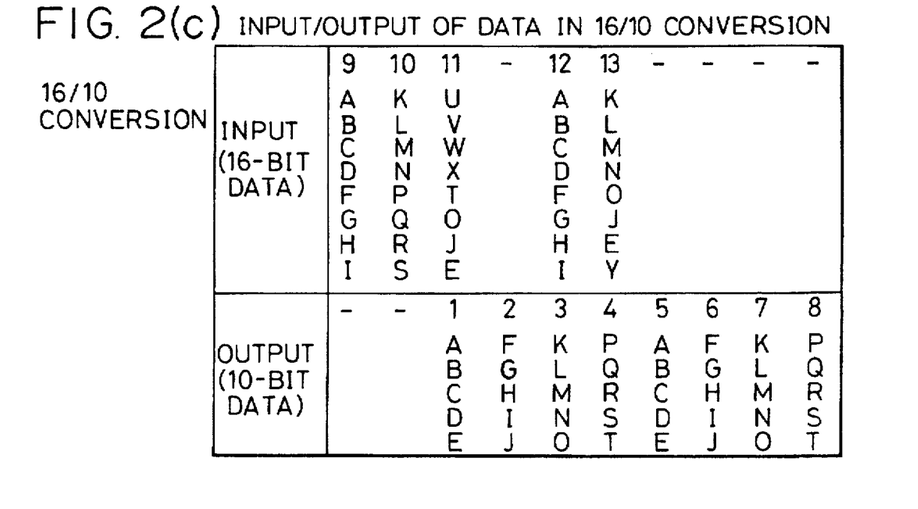

In contrast, in another conventional example, shown in FIGS. 2(a) through 2(c), when forming 16-bit width data, a division is made of input 10-bit width data between the higher-order 8 bits and the lower-order 2 bits.

Thus, when 8-bit width data is input, it is possible to obtain 8-bit width data solely through a division between the higher-order and lower-order 8 bits of 16-bit width data, so that conversion can be easily executed.

In the following the example shown in FIGS. 2(a) through 2(c) will be described.

Input 10-bit width data is held, in the input order, by registers indicated by numerals 1 through 8 in FIG. 2(a). These 8 words of data are converted into 5 words of data of 16-bit width indicated by numerals 9 through 13.

FIG. 2(b) shows the input and output of data in 10/16 conversion.

As shown in FIG. 2(b), the first to fifth items of data 1–5 are successively input to A–Y of registers a–e.

Then, the sixth item of data indicated by numeral 6 is input to A–D of the register a, which has become empty as a result of the output of 16-bit width data indicated by numeral 9. Similarly, the seventh item of data indicated by numeral 7 is input to F–J of the register b, which has become empty as a result of the output of the items of data 9 and 10. Finally, the eighth item of data indicated by numeral 8 is input to K–O of the register c, which has become empty as a result of the output of the item of data indicated by numeral 10.

As for the output of 16-bit width data, ABCDFGHI of the registers a and b is output as the item of data 9 when the second item of data 2 is input; KLMNPQRS of the register c is output as the item of data 10 when the fourth data item of 4 is input; and UVWXTOJ of the registers e, d, c, b and a is output as the item of 11 when the fifth item of data 5 is input. When the seventh item of data 7 is input, ABCDFGHI of the register a is output as the item of data 12. When the last item of data 8 is input, KLMNOJEY of the registers c, b, a and e is output.

Next, the operation of 16/10, i.e., the reverse, conversion shown in FIG. 2(c) will be described.

As shown in FIG. 2(c), the items of 16-bit width data indicated by numerals 9, 10 and 11 are successively input. As for the output of 10-bit width data, the register a becomes full only when the item of data 11 is input, so that, at this point in time, 10-bit width data of A–E is output as the item of data 1.

Next, after the output of 10-bit data F–J of the register b, the item of data indicated by numeral 12 is input to the registers a and b, which have become empty, and, at the same time, the 10-bit data of the register c is output as the item of data 3. Then, the item of data indicated by numeral 13 is input to KLMNOJEY of the registers c, b, a and e, which are the next to have become empty, and, at the same time, the 10-bit data of the register d is output. Finally, the items of 10-bit width data 5·6·7·8 are successively output from the registers e·a·b·c.

In the case of the example shown in FIGS. 1(a) through 1(c), in the 10/16 conversion, items of input 10-bit data are successively blocked by 16 bits, starting from the higher-order bit data, thereby effecting conversion to 16-bit data.

Similarly, in the 16/10 conversion, which is the reverse of the above, items of input 16-bit data are successively blocked by 10 bits, starting from the highest-order-bit data.

Thus, when, for example, 8-bit width data is input for 8/16 conversion, the resultant 16-bit width data obtained through conversion by this circuit cannot be easily converted to 8-bit width data.

In the case of the conventional example shown in FIGS. 2(a) through 2(c), when 8-bit width data is input, it is possible to obtain 8-bit width data solely through a division of 16-bit data into higher-order 8 bits and lower-order 8 bits, thus facilitating data processing.

However, in this case, the control of the conversion circuit is rather complicated, as described above, so that the size of the circuit must be large. Further, due to the discrete existence of data, the efficiency in data transfer is rather poor.

SUMMARY OF THE INVENTION

It is an object of the present invention to solve the problems as described above.

Another object of the present invention is to make data processing possible with a simple circuit construction and operational control.

To achieve these objects, there is provided, in an aspect of the present invention, a data processing apparatus for outputting data input in units of a bits in units of b bits (a<b), including:

(a) a storage unit for storing input data;

(b) control unit for controlling the reading of the storage unit with respect to data stored in the storage unit such that a first item of the b-bit data is formed in such a way as to include all of a first item of the a-bit data and that items of b-bit data succeeding to the first item of the b-bit data are formed by using b/k bits taken from each of k items of the a-bit data of those items of the a-bit data succeeding to the first item of the a-bit data, the control unit further controls the reading of the storage unit such that the portion of the first item of b-bit data other than the a-bit data is formed of (a−b/k) bits of the succeeding items of a-bit data (where a, b and k are integers); and (c) a processing unit for performing a predetermined processing on data read from the storage unit.

Still another object of the present invention is to make it possible to change data processing units with a simple construction to thereby achieve an improvement in data transfer efficiency.

Further objects and features of the present invention will become clear from the following detailed description of the invention with reference to the drawings.

DETAILED DESCRIPTION OF THE PREFERRED EMBODIMENTS

An embodiment of the present invention will now be described in detail with reference to the drawings.

First, the operation of this embodiment will be described with reference to FIGS. 3(a) through 3(c).

Figure 3A:
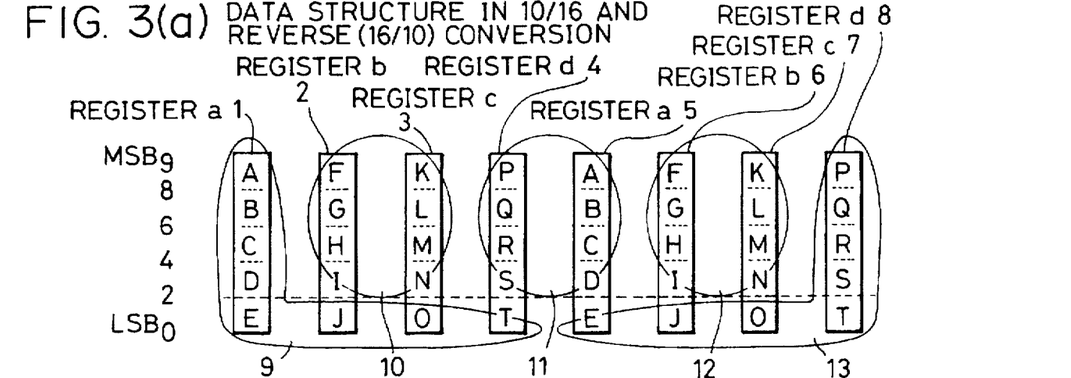
FIGS. 3(a) through 3(c) are conceptual diagrams illustrating an operation according to an embodiment of the present invention.
Figure 3B:
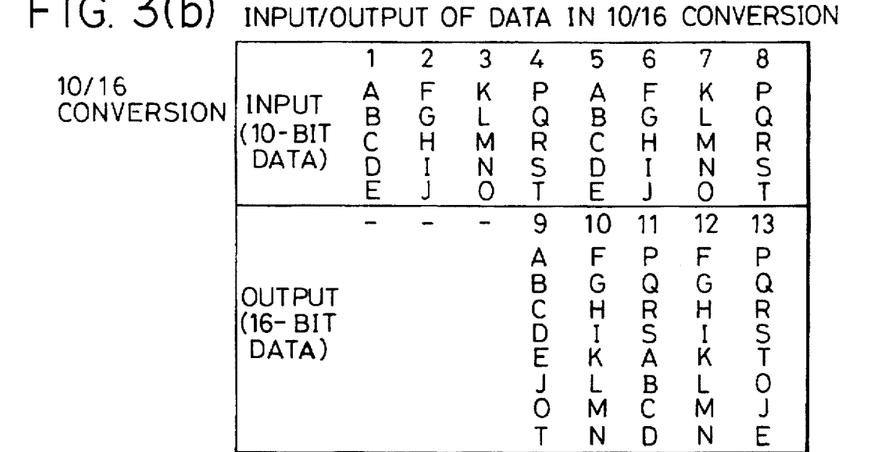
Figure 3C:
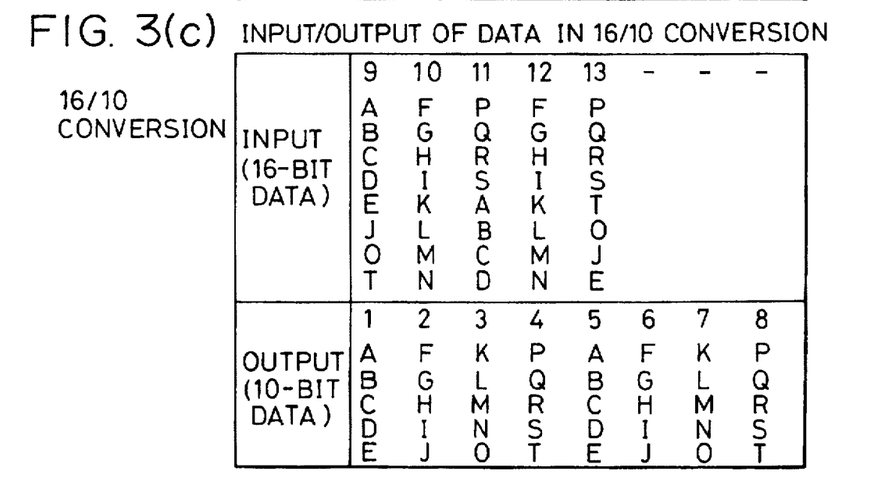

FIGS. 3(a) through 3(c) are conceptual diagrams illustrating a conversion from 10-bit data to 16-bit data and a conversion from 16-bit data to 10-bit data according to this embodiment.

Through this 10/16 conversion, 8 words of 10-bit width data are converted to 5 words of 16-bit width data. Since 16-bit data has only to be transferred 5 times where 10-bit data would have to be transferred 8 times, it is possible to attain an improvement in data transfer efficiency. Further, a memory performing processing in data units of a 16-bit width can reduce its capacity to ⅝, thereby achieving an improvement in memory use efficiency.

In the following, the 10/16 conversion and the 16/10 conversion of this embodiment will be described with reference to FIGS. 3(a) through 3(c).

In FIG. 3(a), the rectangles indicated by numerals 1 through 8 show the construction of items of 10-bit width data input successively, and the elliptical portions indicated by numerals 9 through 13 show the construction of 16-bit width data.

Further, as described in detail below, in terms of hardware construction, four identical 10-bit registers indicated by symbols a through d in the drawing are used, data being input to each of these registers.

That is, items of data 1 through 4 are respectively stored in the registers a through d, and then items of data 5 through 8 are stored in the same registers a through d.

As for the output 16-bit data, an item of data 9 is composed of all the 10 bits in the register a and the lowest 2 bits in each of the registers b, c and d, that is, 16 bits in total. An item of data 10 is composed of the higher 8 bits in the register b and the higher 8 bits in the register c. An item of data 11 is composed of the higher 8 bits of the register d and the higher 8 bits of the register a. An item of data 12, like the data 10, is composed of the higher 8 bits of the register b and the higher 8 bits of the register c. Further, an item of data 13 is composed of all the 10 bits of the register d and the lower 2 bits of each of the registers c, b and a, that is, 16 bits in total.

In this 10/16 conversion, when items of 10-bit width data are input one by one, the first item of data 1 is held by the register a, the second item of data 2 is held by the register b, the item of third data 3 is held by the register c, and the fourth item of data 4 is held by the register d.

As described below, the register a becomes empty upon the input of the fourth item of data, so the fifth item of data is input to the register a. Similarly, when the data of the register b is output, the sixth item of data is input to the register b, and, similarly, the seventh item of data is input to the register c, and the eighth item of data is input to the register d.

In this way, in this embodiment, four 10-bit width registers are used, and input 10-bit data is repetitively processed in units of 8 words while successively changing the registers to which data is input.

Then, the items of data 9 through 13 shown in FIG. 3(a), thus converted so as to form 16-bit width data, are successively output with the timing shown in FIG. 3(b).

That is, first, when the first to third items of 10-bit data are input, no 16-bit data is output. When the fourth item of 10-bit data is input, the 16-bit data 9 is output and, after that, the items of 16-bit data indicated by numerals 10, 11, 12 and 13 are successively output.

Next, the construction of such 16-bit data will be described in more detail by using A~T of FIGS. 3(a) through 3(c).

Symbols A~T indicate data registers each having a 2-bit width.

The register a consists of a 10-bit register composed of A~E. The data register A holds the MSB of input data, and the data registers B, C, D and E hold LSB data in this order. Similarly, the F, K and P of the registers b through d hold the MSB of input data, and the J, O and T thereof hold LSB.

FIG. 3(b) shows the input/output timing for each item of 10-bit and 16-bit data in 10/16 conversion.

As described above, in 10/16 conversion, when the fourth item of data is input, the 16-bit data indicated by numeral 9 is output. At this time, as shown in the drawing, the data construction of the item of data 9 is ABCDEJOT as named from MSB. Subsequently, the fifth data is input, and the item of data 10 is output. The data construction of the item of data 10 is FGHIKLMN. Then, the sixth item of data is input, and the item of data 11, having the construction PQRSABCD is output; the seventh item of data is input, and the item of data 12 having the construction of FGHIKLMN is output; and, finally, the eighth item of data is input, and the item of data 13 having the construction of PQRSTOJE is output.

In 16/10 conversion, a data transfer reverse to that of this 10/16 conversion is performed.

That is, as the first item of input data, the 16-bit data indicated by numeral 9 is input. This item of data 9 is input, starting from the highest-order bit, to ABCDE of the register a, the lower-order bit J of the register b, the lower-order bit O of the register c, and the lower-order bit T of the register d, and, at this time, ABCDE of the register a is output as 10-bit data.

Next, the 16-bit data indicated by numeral 10 is input, as the second item of input data, and this item of data 10 is input, starting from the higher-order bit, to FGHI of the register b and KLMN of the register c, and the FGHIJ of the register b, which has become full of data, is output as 10-bit data.

Subsequently, the 16-bit data indicated by numeral 11 is input as the third item of input data. This data 11 is input, starting from the higher-order bit, to the PQRS of the register d and to the ABCDE of the register a, which has become empty, and the KLMNO of the register c, which is filled with data, is output as 10-bit data.

Next, the 16-bit data indicated by numeral 12 is input as the fourth item of data. This data 12 is input, starting from the higher-order bit, to the FGHI of the register b and the KLMN of the register c, and the PQRST of the register d, which is filled with data, is output as 10-bit data.

Subsequently, the 16-bit data indicated by numeral 13 is input as the fifth item of input data. This data 13 is input, starting from the higher-order bit, to the PQRST of the register d, the data register O of the register c, the data register J of the register b, and the data register E of the register a, and the ABCDE of the register a, filled with data, is output as 10-bit data.

Then, no 16-bit data is input from this onward, and the data which has already been input to the registers is output three times, 10 bits at one time, the data of the registers b, c and d being output as the remaining 10-bit data.

Next, the case in which 8-bit data is input in this embodiment will be described.

When 8-bit data is input, the lowest 2 bits of each of the registers a through d, each having a 10-bit width, are not used. This operation will be described with reference to FIGS. 3(a) through 3(c).

The first item of 8-bit data is input to the ABCD of the register a. Further, the second to fourth items of input 8-bit data are input to the FGHI, KLMN and PQRS of the registers b through d, respectively.

Then, as stated above, the data of the register a is output upon the input of the fourth item of 8-bit data, so that the register a becomes empty. Thus, when the fifth item of 8-bit data is input, the same register a is again used for the input.

Similarly, the sixth to eighth items of 8-bit data are stored in the registers b through d.

In this way, in this embodiment, even when 8-bit width data is input, four registers are used, as in the case of 10-bit width data, and the input 8-bit data is repetitively processed in units of 8 words with successive switching.

The way the 8-bit data stored in each register is converted to 16-bit data and then output will now be described.

As stated above, in 8/16 conversion, the 16-bit data indicated by numeral 9 is output when the fourth item of 8-bit data is input. At this time, as shown in FIG. 3(b), the data construction of this data 9 as named from MSB is ABCDEJOT, of which the lower 8-bits, EJOT, are each "00h".

Subsequently, the fifth item of 8-bit data is input, and 16-bit data indicated by numeral 10 is output. The data construction of this data 10 is FGHIKLMN.

Similarly, the sixth item of 8-bit data is input, and the data indicated by numeral 11, whose data construction is PQRSABCD, is output. The seventh item of 8-bit data is input and the data having the construction of FGHIKLMN is output. Further, the eighth item of 8-bit data is input and the data indicated by numeral 13, having the construction of PQRSTOJE, is output. At this time, the lower-order bits, TOJE, of the data 13 are each "00h" as in the case of the data indicated by numeral 9.

Thus, the operation of this embodiment is the same as that of the 10/16 conversion except that the lower-order 8 bits of the items of data indicated by numerals 9 and 13 are each "00h".

When converting the 16-bit data, thus formed, into 8-bit data, the data conversion as shown in FIG. 1(c) is not executed, but a division of the 16-bit data into higher and lower-order 8 bits suffices. Accordingly, there is no need to provide a circuit for reverse conversion.

Next, the construction of an image taking apparatus including a circuit for such a data conversion will be specifically described as an embodiment of the present invention.

Figure 4:
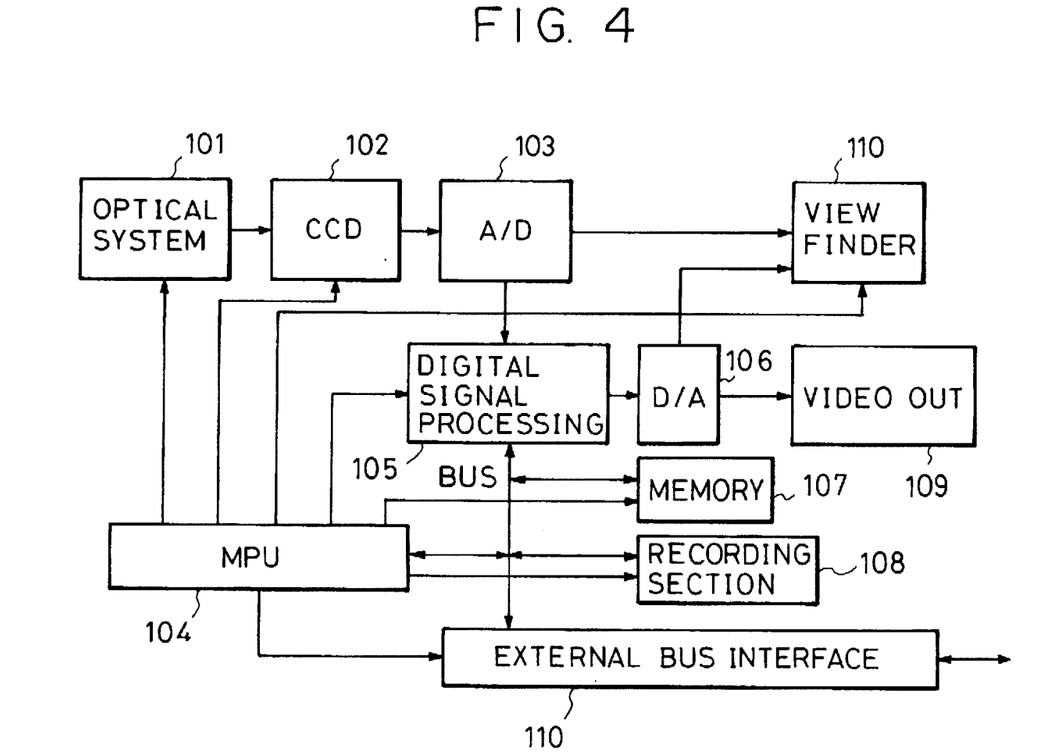
FIG. 4 is a block diagram showing the construction of an image taking apparatus as an embodiment of the present invention.

FIG. 4 is a block diagram showing the construction of an image taking apparatus, such as a video camera, according to an embodiment of the present invention.

In FIG. 4, rays of light from an object are transmitted through an optical system 101 including a lens, an iris, etc. and converted to an electric signal by a CCD 102 to be output to an A/D conversion circuit 103. Taking processing in a computer into account, it is also possible for the CCD 102 to adopt square pixels in addition to sensors for a TV system.

The A/D conversion circuit 103 converts the output image signal from the CCD into a 10-bit digital signal, and outputs it to a digital signal processing circuit 105 and a view finder 110. The view finder 110 displays an image corresponding to image data from the A/D conversion circuit 103 or image data from a D/A conversion circuit 106.

The digital signal processing circuit 105 writes the input digital image signal to a memory 107, and performs image processing, such as white balance, AE correction, gamma processing, image compression or NR, on the image signal in this memory 107 before outputting it to a recording section 108.

The recording section 108 may consist of a well-known VTR, hard disk or the like.

The data conversion circuit described above is included in this digital signal processing circuit 105.

An MPU 104 is a circuit for controlling the operation of the sections of the apparatus shown in FIG. 4. A bus is also connected to this MPU 104, in which a computation processing can be conducted on image data.

Further, it is possible for the image data processed by the digital signal processing circuit 105 to be output to an external apparatus, such as a computer, through an external bus interface 110. Similarly, it is also possible to input image data from an external apparatus.

The image data from the digital signal processing circuit 105 is converted to an analog signal by the D/A conversion circuit 106, and output to the view finder 110 and to a video-out section 109, from which it is output to an external apparatus, such as a VTR as an analog image signal.

Next, the construction and operation of the above-described 10/16 circuit and 16/10 circuit in the digital signal processing circuit 105 in FIG. 4 and of the periphery thereof will be described.

Figure 5:
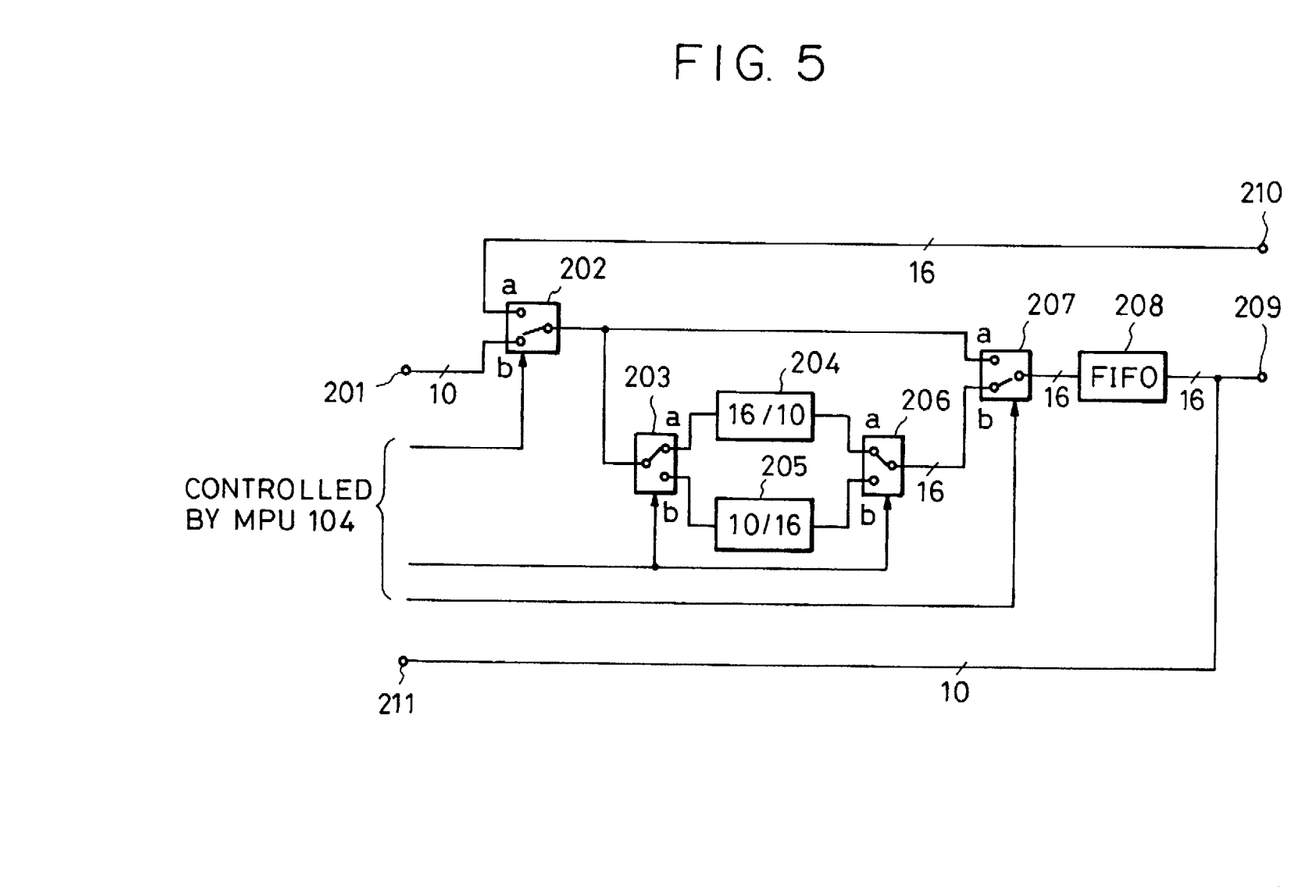
FIG. 5 is a block diagram showing the conversion circuit in FIG. 4 and the construction of the peripheral circuit thereof.

FIG. 5 is a block diagram showing the circuit configuration of the above-described conversion circuits and the periphery thereof.

First, the case in which 10-bit data from the A/D conversion circuit 103 is converted to 16-bit data will be described.

In FIG. 5, the 10-bit image data from the A/D conversion circuit 103 is output to switches 203 and 207 through the b-terminal of a switch 202. The switches 202, 203, 207 and 206 (described later) are all controlled by the MPU 104. When the input 10-bit data is converted to 16-bit data, these switches are controlled such that their b-terminals are connected.

The 10-bit image data output to the switch 203 is output to a 10/16 conversion circuit 205, where it is converted to 16-bit image data in units of 8 words, as described above. This 16-bit data is output through the switches 206 and 207 to a FIFO memory 208, where it is temporarily stored before it is output from a-terminal 209 to a circuit on the output side with a predetermined clock timing.

Next, the case in which 16-bit data from an external apparatus or a recording section is converted to 10-bit data will be described.

In this case, each of the above switches is controlled such that the a-terminal thereof is connected.

The 16-bit data input from a terminal 210 is output through the switches 202 and 203 to a 16/10 conversion circuit 204, where it is converted to 10-bit data as described above. Then, it is output from a terminal 211 through the switch 207 and the FIFO 208.

When the image data from the A/D conversion circuit 103 or the external apparatus is 8-bit data, the above switches are controlled such that their b-terminals are connected, as in the case of the 10-bit data described above, and the 8-bit data is converted to 16-bit data, as described above, by the 10/16 conversion circuit 205 and then output.

Next, the case in which 16-bit data from the external apparatus or the recording section is converted to 8-bit data will be described.

In this case, each of the switches 202 and 207 is connected to the a-side thereof, and the 16/10 conversion circuit 204 is not used. That is, as described above, in this embodiment, the conversion of 8-bit data to 16-bit data is effected in the way as described above, so that, in the reverse conversion, the 16/10 conversion circuit is not used but a division into higher-order 8 bits and lower-order 8 bits is simply effected to obtain 8-bit data.

Further, when it is desired that 16-bit data from the A/D conversion circuit, the recording section, the external apparatus or the like be output as it is, this can be realized by connecting the switch 202 to the input side and the switch 207 to the a-side.

Next, the construction of the 10/16 conversion circuit and 16/10 conversion circuit of FIG. 5 will be specifically described.

Figure 6:
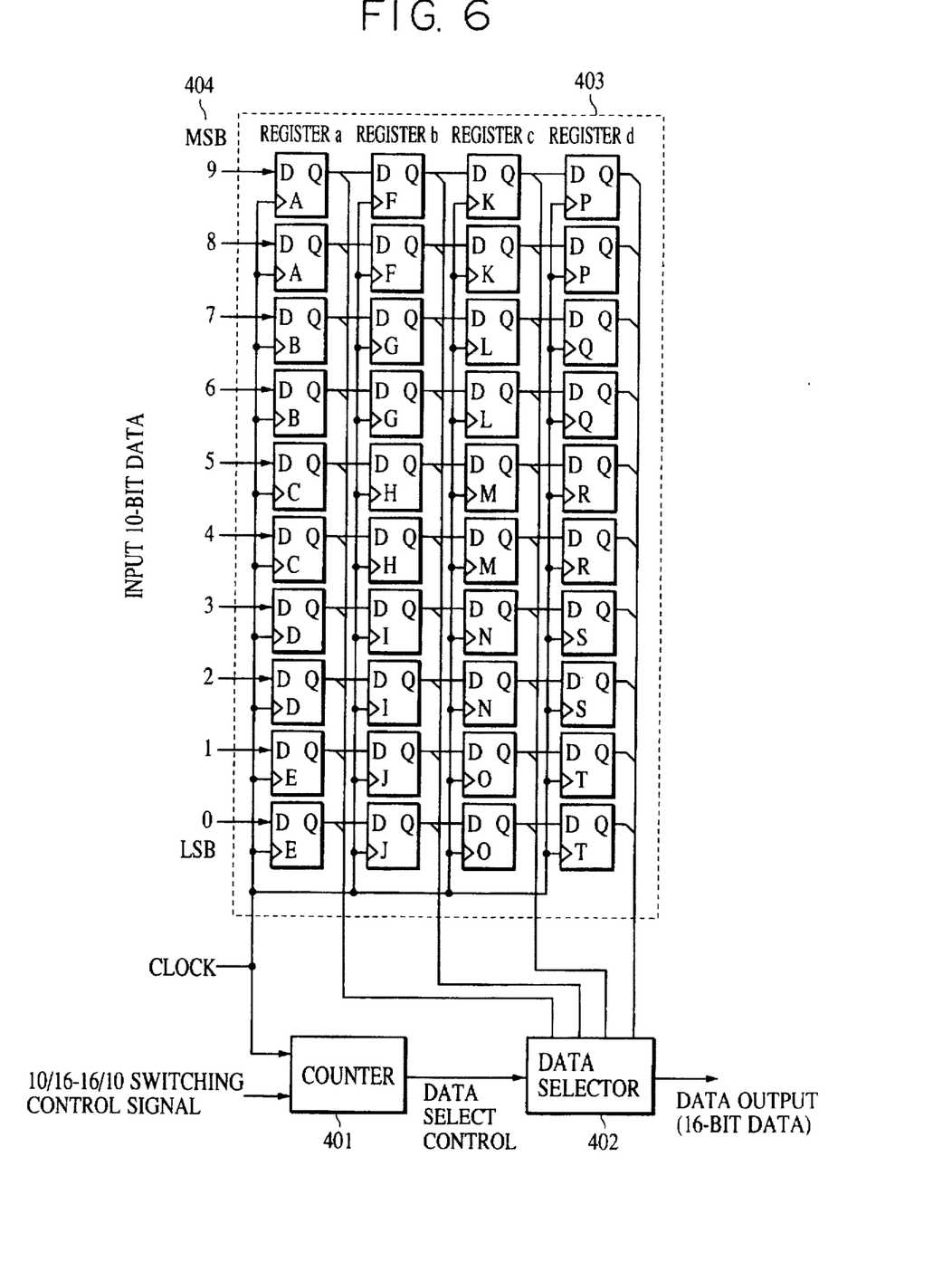
FIG. 6 is a block diagram showing in detail the construction of the circuit shown in FIG. 5.

FIG. 6 is a diagram specifically showing the construction of the 10/16 conversion circuit.

In FIG. 6, numeral 401 indicates a counter for counting clocks in accordance with a switching control circuit; numeral 402 indicates a data selector for selecting output data of the registers in accordance with an output signal from the counter 401 and outputting it; and numeral 403 indicates a register section composed of registers a through d each having ten D-flip-flops.

In FIG. 6, the data input in parallel from an input section 404 is transmitted from the register a to the registers b, c and d sequentially in synchronism with clocks.

The data selector 402 selects output data of these registers in accordance with the output of the counter 401 and outputs data by 16 bits as described above.

In this embodiment, the counter 401, the data selector 402 and the register section 403 are commonly used for both 10/16 and 16/10 conversion, so that a switching control signal for switching between 10/16 and 16/10 is output to the counter 401 to thereby control the operation.

Figure 7:
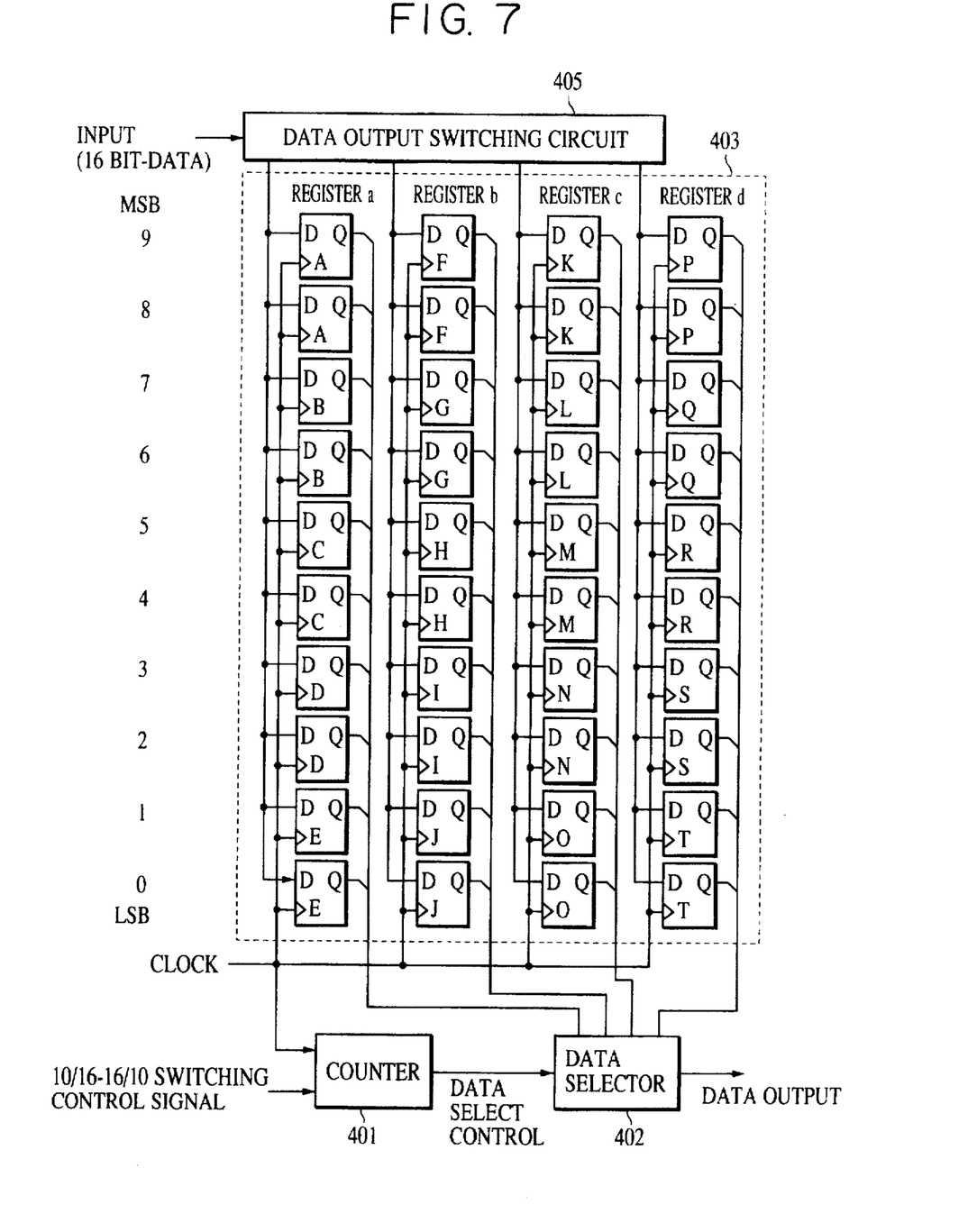
FIG. 7 is a block diagram showing in detail the construction of the circuit shown in FIG. 5.

Next, the 16/10 conversion circuit will be described with reference to FIG. 7.

As stated above, in this embodiment, part of the conversion circuits is commonly used for both conversions, so that the construction of the counter 401, the data selector 402 and the register section 403 is the same as that shown in FIG. 6. In FIG. 7, numeral 405 indicates a data output switching circuit, which outputs input data while distributing it among the registers as described above.

When converting 16-bit data into 10-bit data, the data selector 402 selects data as described above and outputs it by 10 bits. When converting data into 8-bit data, it controls such that the data of the lower-order 4 bits of the first and fifth items of 16-bit data is not output.

As described above, in this embodiment, it is possible to achieve a reduction in the number of component registers when realizing a conversion from 10-bit to 16-bit data and a conversion that is the reverse thereof and a conversion from 8-bit to 16-bit data and a conversion that is the reverse thereof with a common circuit.

Further, in any of these conversions, it is possible to input and output 16-bit data 5 words in succession, so that a collective transfer in units of 5 words is possible, thereby making it possible to achieve a reduction in transfer time and an improvement in transfer efficiency.

Further, the control of the converting operations is simplified, thereby making it possible to avoid an increase in circuit size.

While the above embodiment has been described with reference to an image taking apparatus, this should not be construed restrictively. The present invention is applicable wherever n items of data input in units of a bits are output as m items of data in units of b bits.

That is, as can be seen from the above embodiment described with reference to FIG. 3(a), a first item of b-bit data is formed by using all the a-bit data input first, and b/k bits of each of (n−2) items of a-bit data are stored in registers. Using these (n−2) items of b/k bit data, (m−2) items of b-bit data are formed (Here, a, b, n, m and k are integers).

Further, by using all the n-th item of a-bit data, the m-th item of b-bit data is formed. Then, for the remaining portion of the first b-bit data and the remaining portion of the m-th b-bit data, (a−b)/k bits of each of the (n−2) items of a-bit data, excluding the first and n-th items of a-bit data, are used.

However, here, it is necessary to note the units and number of the registers for holding the input a-bit data. For example, a condition: a>n, may be considered.

Further, while the above embodiment has been described with reference to the case in which a is 10 or 8 and b is 16, other combinations allowing conversion are conceivable (for example, one in which a is a multiple of 5 or 8 and b is a multiple of 8), and the present invention is also applicable to all of such combinations.

As is apparent from the above description, when data input in units of a bits is output in units of b bits, the conversion processing can be simplified, thereby making it possible to avoid an increase in circuit size.

Further, a simplification in processing is also achieved for the reverse conversion.

It is to be understood that the specific embodiments described herein are merely illustrative of the invention and that modifications and changes can readily be made by those skilled in the art without departing from the spirit and scope of the invention.

What is claimed is:

1. A data processing apparatus for converting data input in units of X bits to data in units of Y bits (X<Y), comprising:

(a) storage means for storing input data;

(b) control means for controlling a reading operation of the data from said storage means such that a first item of said Y-bit data is formed in order to include all of a first item of the X-bit data, and that items of Y-bit data succeeding the first item of said Y-bit data are formed using Y/K bits taken from each of K items of X-bit data of plural items of said X-bit data succeeding the first item of said X-bit data, said control means further controlling the reading operation of the data from said storage means such that a portion of the first item of said Y-bit data other than said X bits of the first item of said X-bit data is formed of (X−Y/K) bits of said succeeding plural items of said X-bit data (where X, Y and K are integers); and (c) processing means for performing a predetermined processing on the data read from said storage means.

2. An apparatus according to claim 1, wherein said control means controls the reading operation of the data from said storage means such that M items of said Y-bit data are formed from N items of said X-bit data (where N and M are integers, and X>N ).

3. An apparatus according to claim 2, wherein, when forming the M items of said Y-bit data, said control means controls the reading operation of the data from said storage means such that (M−2) items of said Y-bit data are formed by using Y/K bits of each of N−2 items of said X-bit data other than the first and N-th items of said X-bit data, and that 2 items of said Y-bit data are formed from all of the first item of said X-bit data, all of the N-th item of said X-bit data, and (X−Y/K) bits of each of N−2 items of X-bit data other than the first and N-th items of said X-bit data.

4. An apparatus according to claim 1, further comprising:

image forming means for forming an image of an object and generating digital image data in X bits per pixel, wherein said storage means stores the image data in X bits output from said image forming means.

5. An apparatus according to claim 1, further comprising: interface means for transferring Y-bit data read from said storage means and inputting said X-bit data.

6. An apparatus according to claim 1, wherein said apparatus is capable of converting data input in units of Y bits to data in units of X bits, and wherein when the data is output in units of X bits, said control means further controls the reading operation of the data from said storage means such that the first item of said X-bit data is formed by using X bits of the first item of said Y-bit data, and that plural items of said X-bit data succeeding in the first item of said X-bit data are formed by using Y/K bits of each of plural items of said Y-bit data succeeding in the first item of said Y-bit data and (Y−X) bits of the first item of said Y-bit data.

7. A data processing method for an apparatus for converting data input in units of X bits to data in units of input bits (X<Y) by using storage means for storing input data, including the step of a reading operation of the data from the storage means by controlling such that a first item of said Y-bit data is formed in order to include all of a first item of said X-bit data, that items of Y-bit data succeeding to the first item of said Y-bit data are formed by using Y/K bits taken from each of K items of said X-bit data of those items of said X-bit data succeeding the first item of said a-bit data, and that a portion of the first item of said Y-bit data other than said X bits of the first item of said X-bit data is formed of (X−Y/K) bits of said succeeding items of X-bit data (where X, Y and K are integers).

8. A method according to claim 7, wherein the reading operation of the data from said storage means is controlled such that M items of said Y-bit data are formed from N items of said X-bit data (where N and M are integers, and X>N).

9. A method according to claim 8, wherein, when forming M items of said Y-bit data, the reading operation of the data from said storage means is controlled such that M−2 items of said Y-bit data are formed by using Y/K bits of each of (N−2) items of said X-bit data other than the first and N-th items of said X-bit data, and that 2 items of said Y-bit data are formed by using all of the first item of said X-bit data, all of the N-th item of said X-bit data, and (X−Y/K) bits of each of N−2 items of X-bit data other than the first and N-th items of said X-bit data.

10. A method according to claim 7, wherein said X-bit data is data from image forming means for forming an image of an object and generating digital image data in X bits per pixel.

11. A method according to claim 7, wherein said Y-bit data read from said storage means is transferred and wherein said X-bit data is input.

12. A method according to claim 7, wherein the reading operation of the data from said storage means is further controlled such that the first item of said X-bit data is formed by using X bits of the first item of said Y-bit data, and that plural items of said X-bit data succeeding in the first item of said X-bit data are formed by using Y/K bits of each of plural items of said Y-bit data succeeding in the first item of said Y-bit data and Y−X bits of the first item of said Y-bit data.

* * * * *

UNITED STATES PATENT AND TRADEMARK OFFICE
CERTIFICATE OF CORRECTION

PATENT NO. : 5,761,348
DATED : June 2, 1998
INVENTOR(S) : Yoshihiro Honma

It is certified that error appears in the above-identified patent and that said Letters Patent is hereby corrected as shown below:

COLUMN 2

Line 16, "11" should read --data 11--.

COLUMN 3

Line 6, "control" should read --a control--; and
    Line 34, "FIGS. 3(a)" should read --¶ FIGS. 3(a)--.

COLUMN 7

Line 33, "a-terminal 209" should read --a terminal 209--.

COLUMN 10

Line 17, "input bits" should read --Y bits--; and
    Line 26, "a-bit" should read --X-bit--.

Signed and Sealed this

Thirtieth Day of March, 1999

Attest:

Q. TODD DICKINSON

*Attesting Officer*    *Acting Commissioner of Patents and Trademarks*